United States Patent [19]
Fujiwara et al.

[11] Patent Number: 5,209,421
[45] Date of Patent: May 11, 1993

[54] NOISELESS EMERGENCY LOCKING TYPE RETRACTOR

[75] Inventors: Ryoichi Fujiwara; Masanori Murata, both of Shizuoka, Japan

[73] Assignee: Fuji-Autolib Co., Ltd., Japan

[21] Appl. No.: 763,247

[22] Filed: Sep. 20, 1991

[30] Foreign Application Priority Data

Sep. 27, 1990 [JP] Japan .............................. 2-101166[U]
Sep. 27, 1990 [JP] Japan .............................. 2-101167[U]

[51] Int. Cl.[5] ........................................... B60R 22/40
[52] U.S. Cl. ............................................. 242/107.4 A
[58] Field of Search ................. 242/107.4 A, 107.4 B, 242/107.4 R, 107.4 C, 107.4 D, 107.4 E, 107; 280/806, 807; 297/476, 477, 478

[56] References Cited

U.S. PATENT DOCUMENTS

| 3,287,063 | 11/1966 | Nicholas | 297/388 |
| 4,393,995 | 7/1983 | Tukamoto | 242/107.4 A |
| 4,560,115 | 12/1985 | Toyama et al. | 242/107.4 A |

FOREIGN PATENT DOCUMENTS

3019275 11/1981 Fed. Rep. of Germany.
3140270 4/1983 Fed. Rep. of Germany.
3205515 6/1983 Fed. Rep. of Germany.

Primary Examiner—John M. Jillions
Attorney, Agent, or Firm—Ronald P. Kananen

[57] ABSTRACT

A noiseless emergency locking type retractor for a seat belt is disclosed. The retractor comprises a housing; a shaft rotatably received in the housing for selectively winding and unwinding the seat belt thereabout and therefrom; an emergency locking device including a stand-man holder tightly held by the housing, a stand-man operatively held by the holder and a pivotal lever member, the pivotal lever member locking the shaft against rotation in a direction to draw the seat belt therefrom when the stand-man is inclined relative to the stand-man holder; and a structure mounted to the housing to define a sound insulating enclosed space in which the stand-man and the pivotal lever member are installed.

10 Claims, 5 Drawing Sheets

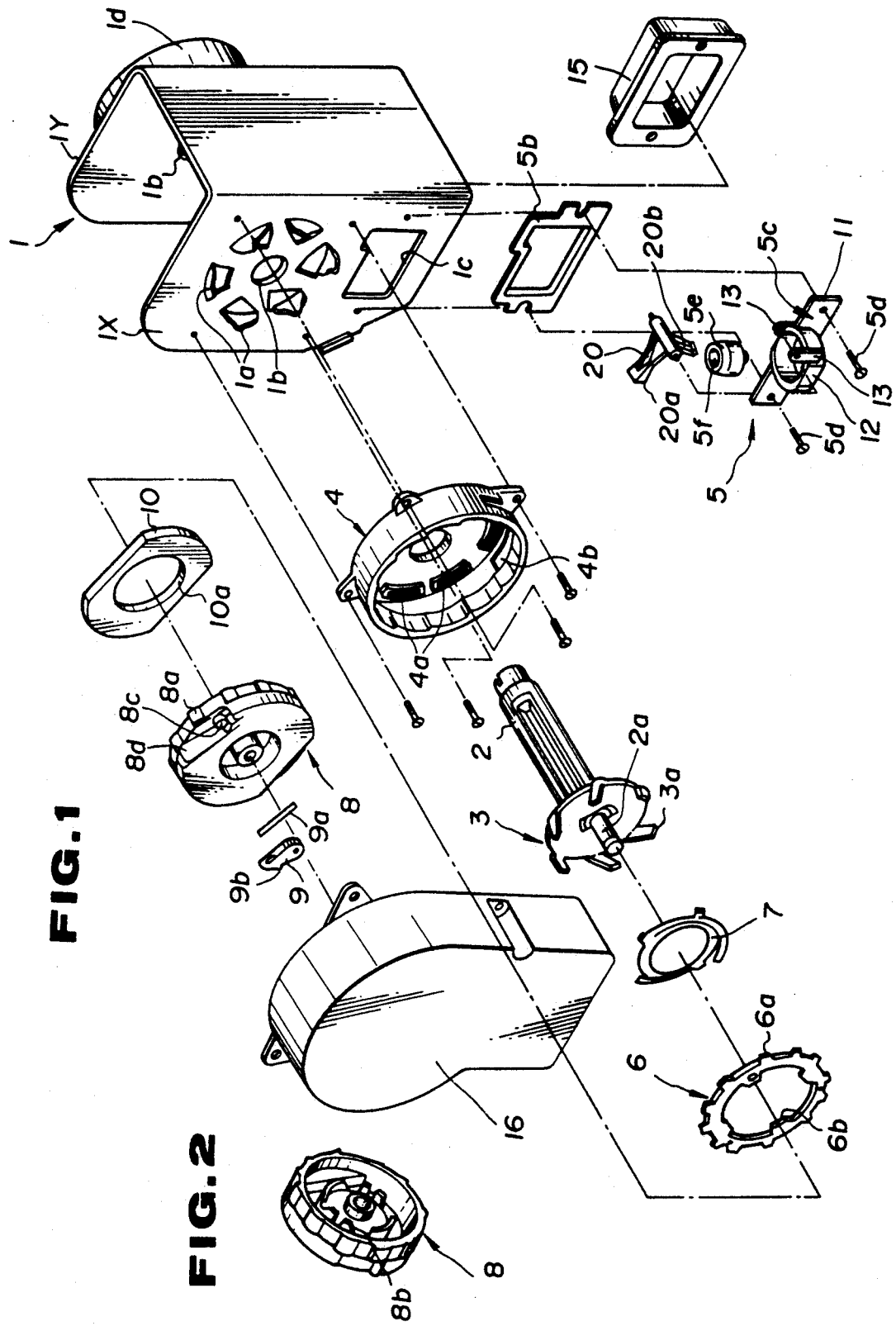

NOISELESS EMERGENCY LOCKING TYPE RETRACTOR

BACKGROUND OF THE INVENTION

1. Field of the Invention

The present invention relates in general to seat belt retractors for use in a seat belt system installed in a motor vehicle, and more particularly to seat belt retractors of an emergency locking type which arrests the drawing of the seat belt therefrom upon sensing abnormal deceleration due to a vehicle collision or the like. More specifically, the present invention is concerned with the emergency locking type retractors which are constructed to produce less noise during their use.

2. Description of the Prior Art

In order to clarify the task of the present invention, a typical emergency locking type seat belt system will be described with an aid of FIG. 8 which shows a conventional emergency locking type retractor.

The seat belt system comprises generally a seat belt proper, a through ring with a tongue, an emergency locking type retractor and a belt anchor with a buckle. The seat belt proper extends upward from a lower outside portion of a vehicle cabin, turns back at a belt holder fixed to a higher outside portion of the cabin and extends downward to be retracted by the retractor which is mounted to the lower outside portion of the cabin. The through ring has the seat belt proper slidably passed therethrough. The belt anchor is mounted to a lower inside portion of the vehicle cabin. When the tongue of the through ring is brought into engagement with the buckle of the belt anchor, a so-called "three point restraining condition" is assumed by the seat belt system.

As is seen from FIG. 8, the emergency locking type retractor comprises a housing 29 fixed to the vehicle body, a belt retracting shaft 100 rotatably disposed in the housing 29 and having the seat belt proper wound thereabout, a coil spring (not shown) for biasing the shaft 100 in a direction to retract the seat belt proper, and a locking device which locks the belt retracting shaft 100 upon sensing abnormal deceleration of the vehicle.

As shown in the drawing, the locking device comprises a ratchet wheel 36 which is coaxially secured to the belt retracting shaft 100 to rotate therewith. Teeth of the ratchet wheel 36 are denoted by numerals 37. Located near the ratchet wheel 36 is a stand-man holder 30 which is tightly secured to the housing 29 through a bracket 11. The stand-man holder 30 has a small recess 31 at its bottom. A stand-man 32 (or weight) is loosely received in the holder 30 in such a manner that a lower projection 33 of the stand-man 32 is put in the small recess 31. The stand-man 32 has a tapered recess at a head portion. Between the ratchet wheel 36 and the stand-man 32, there is arranged a bent lever 34 which is pivotally connected through a pivot pin (no numeral) to the housing 29. One arm portion of the bent lever 34 is slidably engaged with the tapered recess of the stand-man 32 and the other arm portion 35 of the same is shaped like a pawl.

Usually, the stand-man 32 stands upright as shown by the solid line. Under this condition, the pawl of the bent lever 34 is kept away from the ratchet wheel 36, and thus, the belt retracting shaft of the belt retractor is permitted to rotate in both directions.

When, due a vehicle collision or the like, abnormal deceleration is sensed by the stand-man 32, the same is inclined as shown by a phantom line. This inclination causes the bent lever 34 to assume its operative position as shown by a phantom line wherein the pawl of the bent lever 34 abuts against one of the teeth 37 of the ratchet wheel 36. Under this condition, the belt retracting shaft 100 is locked against rotation in the direction to draw the seat belt proper from the retractor.

However, due to its inherent construction, the above-mentioned emergency locking type retractor tends to produce noises during its normal use.

That is, during cruising of the vehicle, the stand-man 32 is forced to vibrate finely due to the vibration of the vehicle. The fine vibration of the stand-man 32 causes beating of the same against the stand-man holder 30 thereby generating noises. Furthermore, the vibration of the stand-man 32 induces vibration of the bent lever 34, which also causes generation of noises. These noises are amplified by the resonance effect of the housing 29 and thus they are very offensive to the ear.

SUMMARY OF THE INVENTION

It is therefore an object of the present invention to provide a noiseless emergency locking type retractor which is free of the above-mentioned drawback.

According to the present invention, there is provided an emergency locking type retractor for a seat belt. The retractor comprises a housing; a shaft rotatably received in the housing for selectively winding and unwinding the seat belt thereabout and therefrom; emergency locking means including a stand-man holder tightly held by the housing, a stand-man operatively held by the holder and a pivotal lever member, the pivotal lever member locking the shaft against rotation in a direction to draw the seat belt therefrom when the stand-man is inclined relative to the stand-man holder; and a structure mounted to the housing to define a sound insulating enclosed space in which the stand-man and the pivotal lever member are installed.

BRIEF DESCRIPTION OF THE INVENTION

Other objects and advantages of the present invention will become apparent from the following description when taken in conjunction with the accompanying drawings, in which:

FIG. 1 is an exploded view of an emergency locking type retractor according to the present invention;

FIG. 2 is a perspective view of a ratchet wheel employed in the emergency locking type retractor of the invention;

DETAILED DESCRIPTION OF THE INVENTION

Figure 3:
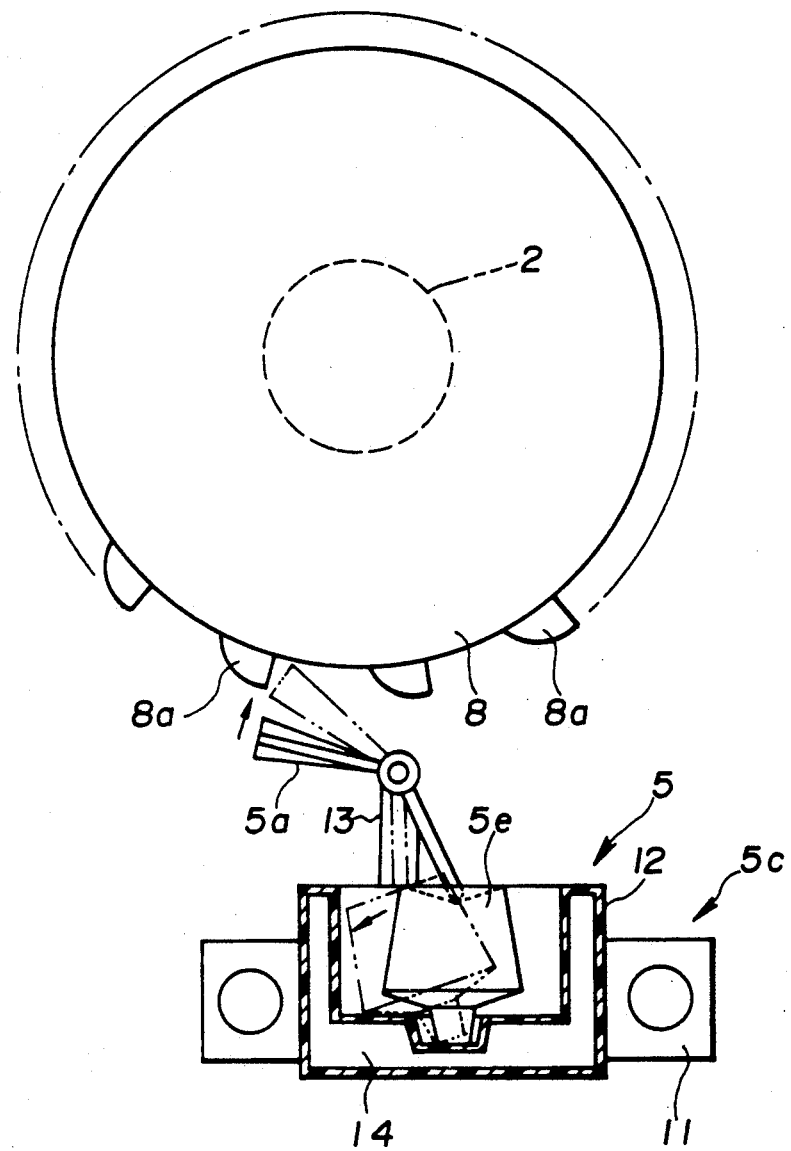
FIG. 3 is a schematically illustrated sectional view of an essential portion of the retractor of the invention.

Referring to FIGS. 1 to 5, particularly FIG. 1, there is shown an emergency locking type retractor of the present invention.

Designated by numeral 1 is a housing which has aligned openings 1b and 1b at its side walls 1x and 1y. The side wall 1x is formed with a plurality of equally spaced pawls 1a about the opening 1b. A belt retracting shaft 2 is rotatably received in the aligned openings 1b and 1b of the housing 1. A spring case 1d is mounted to the side wall 1y of the housing 1. Within the case 1d, there is installed a spiral spring for biasing the shaft 2 in a direction to retract a seat belt (not shown). A circular case 4 is mounted to the other side wall 1x of the housing 1. The circular case 4 is formed with a plurality of arcuate slots 4a through which the pawls 1a of the housing 1 are inserted into the case 4. Within the case 4, there is installed a ratchet wheel 8 which is coaxially disposed about the belt retracting shaft 2 in an aftermentioned manner. The circular case 4 has at its cylindrical side wall a rectangular opening 4b through which one arm portion 20a of an after-described bent lever 20 is inserted into the case 4. That is, the arm portion 20a is operatively engageable with external teeth 8a of the ratchet wheel 8 which is installed in the circular case 4.

The belt retracting shaft 2 has at one end a smaller diameter pin portion 2a. A shaft wheel 3 is coaxially connected to the belt retracting shaft 2 having the pin portion 2a exposed to outside. The shaft wheel 3 is formed at its periphery with a plurality of equally spaced pawls 3a. Each pawl 3a is bent toward the axis of the pin portion 2a and inclined somewhat in a circumferential direction, as shown.

The ratchet wheel 8 is coaxially and pivotally disposed about the pin portion 2a of the shaft 2 having an annular spring 7, a lock plate 6 and an inertia plate 10 operatively interposed between the ratchet wheel 8 and the shaft wheel 3.

The lock plate 6 is formed with external teeth 6a which are engageable with both the pawls 3a of the shaft wheel 3 and the pawls 1a of the housing 1, and internal teeth 6b which are engageable with cam surfaces 8b (see FIG. 2) formed in the ratchet wheel 8. That is, as is seen from FIG. 2, the ratchet wheel 8 is formed with a circular recess in which the cam surfaces 8b are defined. The external teeth 8a of the ratchet wheel 8 are rounded. The inertia plate 10 is oval in shape and has a circular opening 10a. The inertia plate 10 is rotatably received in the recess of the ratchet wheel 8 having the circular opening 10a thereof coaxially disposed about the cam surfaces 8b of the ratchet wheel 8.

The ratchet wheel 8 is formed at its diametrically opposed portions with rectangular openings 8d through which the interior of the ratchet wheel 8 and outside of the same are communicated. Each rectangular opening 8d receives therein a pawl member 9 which is pivotally connected to a stud 8c formed on the ratchet wheel 8. The pawl member 9 is biased radially inward by a plate spring 9a incorporated therewith. The pawl member 9 has a projection 9b which is slidably engageable with a peripheral cam portion of the inertia plate 10. Thus, upon rotation of the inertia plate 10 in the ratchet wheel 8, the pawl members 9 are projected outward against the biasing force of the springs 9a.

The deceleration sensor 5 comprises a stand-man holder 5c which is secured through its bracket 11 to a lower outside surface of the side wall 1x of the housing 1 with a rectangular frame 5b interposed therebetween. The side wall 1x is formed with a rectangular opening 1c through which a part of the stand-man holder 5c is projected into the housing 1. For the connection of the stand-man holder 5c and the frame 5b to the side wall 1x, two bolts 5d are used.

Figure 5:
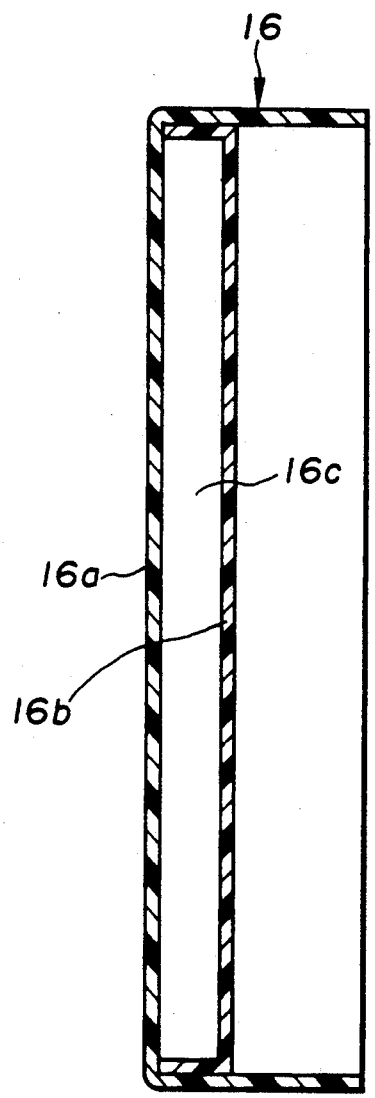
FIG. 5 is a sectional view of a sensor cover employed in the invention.

A stand-man 5e (or weight) is operatively received in the holder 5c in a manner similar to that as has been described in the conventional emergency locking type retractor of FIG. 5.

A bent lever 20 is pivotally supported by two supports 13 formed on the stand-man holder 5c. The bent lever 20 comprises the aforementioned one arm portion 20a projectable into the circular case 4 and the other arm portion 20b slidably engaged with a tapered recess 5f of the stand-man 5e.

A dust cover 15 is fixed to an inside surface of the side wall 1x of the housing 1 to cover the rectangular opening 1c.

A sensor cover 16 is fixed to the outside surface of the side wall 1x to cover the parts 4, 3, 7, 6, 10, and 8, and their associated parts.

Usually, the stand-man 5e stands upright like in the case of the above-mentioned conventional emergency locking type retractor. Under this condition, the arm portion 20a is kept away from the ratchet wheel 8, and thus, the belt retracting shaft 2 is permitted to rotate in both directions. However, when, due to a vehicle collision or the like, abnormal shock is sensed by the stand-man 5e, the same is inclined to cause the bent lever 20 to assume its operative position wherein the arm portion 20a abuts one of the teeth 8a of the ratchet wheel 8. Under this condition, the belt retracting shaft 2 is locked against rotation in the direction to draw the belt from the retractor.

In the present invention, the following measure is employed for minimizing or lessening the noises generated by the stand-man 5e.

That is, as is shown in FIG. 3, the stand-man holder 5c substantially consists of a box part 12 of a double wall construction, the bracket 11 and the supports 13, which are combined to constitute a united structure. Preferably, the stand-man holder 5c is constructed of fiber-reinforced engineering plastics or the like. The box part 12 comprises outer and inner walls between which a sound insulating air space 14 is defined.

Figure 4:
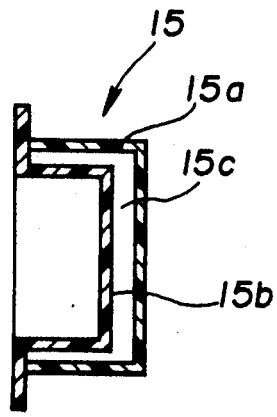
FIG. 4 is a sectional view of a dust cover employed in the invention.

As is seen from FIG. 4, the dust cover 15 is also of a double wall construction, which comprises outer and inner walls 15a and 15b between which a sound insulating air space 15c is defined. Furthermore, as is seen from FIG. 5, the sensor cover 16 has a double bottom which comprises outer and inner walls 16a and 16b between which a sound insulating air space 16c is defined. Preferably, the duct cover 15 and the sensor cover 16 are constructed of fiber-reinforced engineering plastics or the like.

If desired, the air spaces 14, 15c and 16c of the stand-man holder 5c, the dust cover 15 and the sensor cover 16 may be filled with a sound insulating material, such as, fixed oil, glass fiber, asphalt sheet, rubber tips, plastic tips or the like.

As will be understood from the above, the box part 12 of the stand-man holder 5c, the dust cover 15 and the sensor cover 16, which are of a double wall construction, constitute a sound insulating enclosed space in which the stand-man 5e and the bent lever 20 are operatively installed. Thus, even when the vibration of the stand-man 5e produces noises in the stand-man holder 5c, the enclosed space shuts out or at least minimizes the noise propagation to outside of the retractor.

Figure 6:
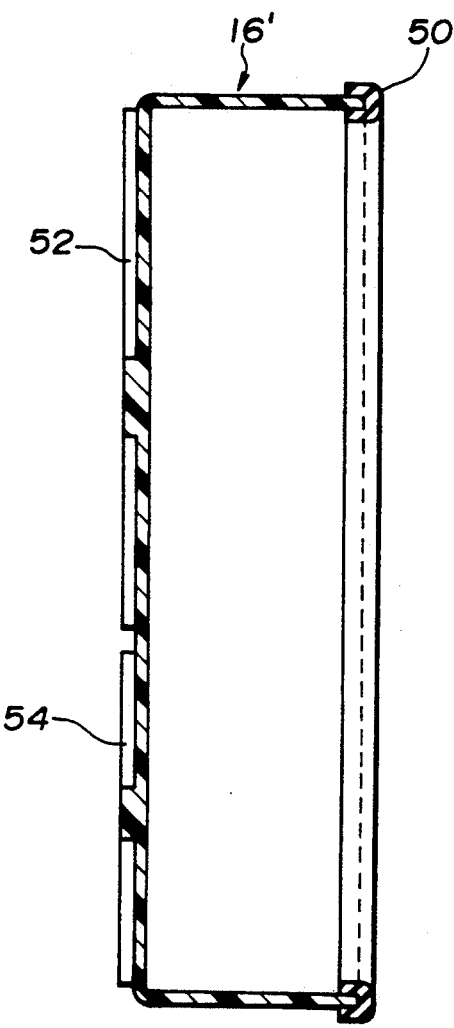
FIG. 6 is a view similar to FIG. 5, but showing a modified sensor cover employable in the invention.
Figure 7:
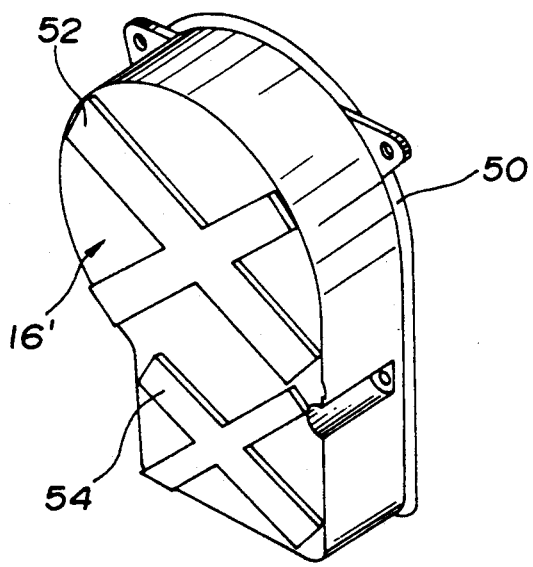
FIG. 7 is a perspective view of the modified sensor cover.
Figure 8:
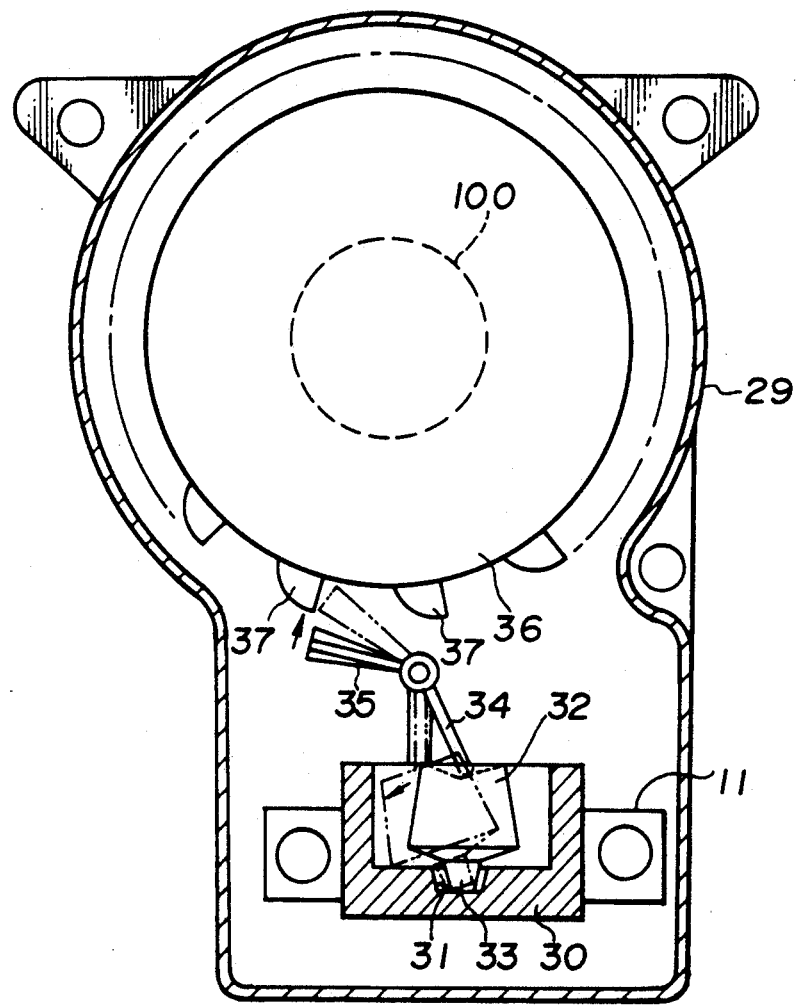
FIG. 8 is a view similar to FIG. 3, but showing a conventional emergency locking type retractor.

Referring to FIGS. 6 and 7, there is shown a modified sensor cover 16' which is employable in the invention.

As is seen from FIG. 6, the modified sensor cover 16' has around its mouth portion an elastomeric seal member 50 detachably attached thereto. When the sensor cover 16' is fixed to the side wall 1x of the housing 1, the seal member 50 is tightly compressed therebetween. Furthermore, as is seen from FIG. 7, the sensor cover 16' has on an outer surface of its bottom two X-shaped beams 52 and 54. With these beams 52 and 54, the rigidity of the sensor cover 16' is increased. Thus, when the modified sensor cover 16' is employed in place of the aforementioned sensor cover 16, the sound insulating effect is much assured.

What is claimed is:

1. An emergency locking type retractor for a seat belt, comprising:
    a housing;
    a shaft rotatably received in said housing for selectively winding and unwinding the seat belt therabout and therefrom;
    emergency locking means including a stand-man holder tightly held by said housing, a stand-man operatively held by said holder and a pivotal lever member, said pivotal lever member locking said shaft against rotation in a direction to draw the seat belt therefrom when said stand-man is inclined relative to said stand-man holder; and
    a structure mounted to said housing to define a sound insulating enclosed space in which said stand-man and said pivotal lever member are installed, said structure comprising;
        a box-like part of said stand-man holder in which said stand-man is operatively installed, said box-like part being of a double wall construction;
        a dust cover fixed to an inside surface of a wall of said housing for covering an opening formed in said wall of said housing, said opening being an opening through which a part of said emergency locking means is projected into said housing, said dust cover being of a double wall construction; and
        a sensor cover fixed to an outside surface of said wall for covering essential parts of said emergency locking means, said sensor cover being of a double wall construction.

2. An emergency locking type retractor as claimed in claim 1, in which each of said double wall constructions comprises outer and inner walls between which a sound insulating space is defined.

3. An emergency locking type retractor as claimed in claim 2, in which said structure is constructed of a reinforced engineering plastic.

4. An emergency locking type retractor as claimed in claim 2, in which said space is filled with a sound insulating material.

5. An emergency locking type retractor as claimed in claim 4, in which said sound insulating material is selected from a group consisting of air, fixed oil, glass fiber, asphalt sheet, rubber tips and plastic tips.

6. An emergency locking type retractor as claimed in claim 1, in which said structure is formed with beams for increasing the rigidity thereof.

7. An emergency locking type retractor as claimed in claim 6, in which at least a part of said structure is fixed to said housing with an interposal of an elastomeric sealing member therebetween.

8. An emergency locking type retractor as claimed in claim 1, in which said stand-man holder, said dust cover and said sensor cover are constructed of reinforced engineering plastics.

9. An emergency locking type retractor as claimed in claim 8, in which said sensor cover is formed with beams for increasing the rigidity thereof.

10. An emergency locking type retractor as claimed in claim 9, in which said sensor cover is fixed to said wall of the housing with an interposal of an elastomeric sealing member therebetween.

* * * * *